United States Patent
Meschke et al.

(10) Patent No.: US 9,050,925 B2
(45) Date of Patent: Jun. 9, 2015

(54) VEHICLE HAVING AN ELECTRIC DRIVE

(71) Applicant: Volkswagen AG, Wolfsburg (DE)

(72) Inventors: Jens Meschke, Rethen (DE); Marcus Kern, Lehre (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 13/845,912

(22) Filed: Mar. 18, 2013

(65) Prior Publication Data

US 2013/0214921 A1   Aug. 22, 2013

Related U.S. Application Data

(63) Continuation of application No. PCT/EP2011/004536, filed on Sep. 8, 2011.

(30) Foreign Application Priority Data

Sep. 18, 2010   (DE) .......................... 10 2010 045 996

(51) Int. Cl.
*B60Q 1/54* (2006.01)
*B60Q 5/00* (2006.01)
*G10K 15/02* (2006.01)

(52) U.S. Cl.
CPC ............... *B60Q 5/008* (2013.01); *G10K 15/02* (2013.01)

(58) Field of Classification Search
CPC ..................................................... G10K 15/02
USPC ........ 340/384.1, 384.3, 384.4, 425.5; 381/86; 701/22
See application file for complete search history.

(56) References Cited

U.S. PATENT DOCUMENTS

| | | | | |
|---|---|---|---|---|
| 4,143,352 | A * | 3/1979 | Jarmotz | 340/441 |
| 4,558,460 | A * | 12/1985 | Tanaka et al. | 381/86 |
| 5,432,026 | A | 7/1995 | Sahm et al. | |
| 5,635,903 | A * | 6/1997 | Koike et al. | 340/441 |
| 8,669,858 | B2 * | 3/2014 | Yoshino et al. | 340/466 |
| 2008/0123871 | A1 | 5/2008 | Trzmiel | |
| 2009/0080672 | A1 | 3/2009 | Smith | |
| 2010/0266135 | A1 * | 10/2010 | Theobald et al. | 381/71.4 |
| 2012/0068836 | A1 * | 3/2012 | Konet et al. | 340/425.5 |

FOREIGN PATENT DOCUMENTS

| | | |
|---|---|---|
| DE | 29 36 981 A1 | 3/1981 |
| DE | 38 30 783 C1 | 3/1990 |
| DE | 43 09 621 A1 | 9/1994 |
| DE | 10 2004 040 228 A1 | 3/2006 |
| DE | 10 2009 041 975 A1 | 5/2010 |

(Continued)

OTHER PUBLICATIONS

Roger N. Shepard, "Circularity in Judgments of Relative Pitch," J. of Acoustical Soc. of America, vol. 36, No. 12, pp. 2346-2353 (Dec. 1964).

*Primary Examiner* — Brent Swarthout
(74) *Attorney, Agent, or Firm* — Muncy, Geissler, Olds & Lowe, P.C.

(57) ABSTRACT

A vehicle having an electric drive and having a sound transducer is provided. The vehicle has a sound generator for substantially simultaneously emitting a first noise having increasing frequency and decreasing loudness, a second noise having increasing frequency and increasing loudness, and at least a third noise having increasing frequency by means of the sound transducer, in particular during increasing rotational speed of the electric drive.

18 Claims, 3 Drawing Sheets

(56) References Cited

FOREIGN PATENT DOCUMENTS

| | | |
|---|---|---|
| EP | 0 025 537 A1 | 3/1981 |
| EP | 1 865 494 A1 | 12/2007 |
| EP | 1 927 512 A2 | 6/2008 |
| JP | 11-245722 A | 9/1999 |

* cited by examiner

VEHICLE HAVING AN ELECTRIC DRIVE

This nonprovisional application is a continuation of International Application No. PCT/EP2011/004536, which was filed on Sep. 8, 2011, and which claims priority to German Patent Application No. DE 10 2010 045 996.8, which was filed in Germany on Sep. 18, 2010, and which are both herein incorporated by reference.

BACKGROUND OF THE INVENTION

1. Field of the Invention

The invention relates to a vehicle having an electric drive and having a sound transducer.

2. Description of the Background Art

DE 10 2009 058 152, which is incorporated herein by reference, describes a vehicle having an electric drive and having a sound transducer for emitting an artificial vehicle noise, wherein the vehicle has a sound generator for emitting or amplifying the artificial vehicle noise when a pedestrian is detected in front of the vehicle, for suppressing the artificial vehicle noise when the vehicle is stationary, especially at a traffic light, and/or for suppressing the artificial vehicle noise on streets of a predetermined type.

The Web page www.heise.de/autos/artikel/Toyota-kuenstliches-Motorgeraeusch-fuer-Elektroautos-1067863.html discloses the automatic variation of artificial engine noises as a function of the speed and current acceleration of the vehicle. The artificial engine noise is radiated forward in the direction of travel from a water-tight sound transducer system under the radiator grill.

Vehicles having an electric drive are disclosed, for example, in DE 43 09 621 A1 (which corresponds to U.S. Pat. No. 5,432,026) and DE 10 2004 040 228 A1.

SUMMARY OF THE INVENTION

It is therefore an object of the invention to provide an improved vehicle having an electric drive. In particular, the intent is to avoid disadvantages from the prior art.

In an embodiment, the aforementioned object is attained by a vehicle having an electric drive and having a sound transducer, wherein the vehicle comprises a sound generator for simultaneous emission of a first noise with increasing frequency and decreasing volume, a second noise with increasing frequency and increasing volume, and at least one third noise with increasing frequency by means of the sound transducer, in particular with increasing speed of the electric drive, and/or a first noise with decreasing frequency and decreasing volume, a second noise with decreasing frequency and increasing volume, and at least one third noise with decreasing frequency by means of the sound transducer, in particular with decreasing speed of the electric drive.

In an embodiment of the invention, a vehicle having an electric drive is, in particular, a vehicle having an electric motor drive that is provided for propulsion of the vehicle. A vehicle having an electric drive can be a so-called purely electric vehicle or can also be what is called a hybrid vehicle. A hybrid vehicle typically includes, in particular, an electric motor drive that is provided for propulsion of the vehicle along with an internal combustion engine. A vehicle having an electric drive in the meaning of the invention is, for example, a vehicle known from DE 43 09 621 A1 or from DE 10 2004 040 228 A1.

A noise in the meaning of the invention can be an acoustic signal that is maintained on an ongoing basis. In particular, provision is made for an increasing or decreasing frequency to vary continuously. Multiple noises form a Shepard-Risset glissando. A noise can include, for example, a fundamental tone (pure tone), or a fundamental tone and harmonics of the fundamental tone, or a virtual fundamental tone comprising harmonics of the fundamental tone corresponding to the virtual fundamental tone, but not the fundamental tone itself and not at least the first harmonic, or a virtual fundamental tone comprising harmonics of the fundamental tone corresponding to the virtual fundamental tone, but not the fundamental tone itself and not at least the first and second harmonics. A noise can also include, for example, a virtual fundamental tone comprising harmonics of the fundamental tone corresponding to the virtual fundamental tone, but not the fundamental tone itself and not at least the first, second, and third harmonics or a virtual fundamental tone comprising harmonics of the fundamental tone corresponding to the virtual fundamental tone, but not the fundamental tone itself and not at least the first, second, third, and fourth harmonics, or a fundamental tone (pure tone), or a fundamental tone and harmonics of the fundamental tone, or a virtual fundamental tone comprising harmonics of the fundamental tone corresponding to the virtual fundamental tone, but not the fundamental tone itself, or a virtual fundamental tone comprising harmonics of the fundamental tone corresponding to the virtual fundamental tone, but not the fundamental tone itself and not at least the first harmonic, or a virtual fundamental tone comprising harmonics of the fundamental tone corresponding to the virtual fundamental tone, but not the fundamental tone itself and not at least the first and second harmonics, or a virtual fundamental tone comprising harmonics of the fundamental tone corresponding to the virtual fundamental tone, but not the fundamental tone itself and not at least the first, second, and third harmonics, or a virtual fundamental tone comprising harmonics of the fundamental tone corresponding to the virtual fundamental tone, but not the fundamental tone itself and not at least the first, second, third, and fourth harmonics.

A sound transducer can be, for example, a device for converting electrical signals into sound. According to an embodiment of the invention, a loudspeaker or structure-borne sound transducer can serve as the sound transducer. However, other known sound transducers can also be employed.

In an embodiment of the invention, the frequency or pitch of the first noise (for increasing frequency) can be higher than the frequency or pitch of the third noise, in particular by at least one octave. In a further embodiment of the invention, the frequency or pitch of the third noise (for increasing frequency) can be higher than the frequency or pitch of the second noise, in particular by at least one octave.

In an embodiment of the invention, the frequency of the first noise (for increasing frequency) can be three, five, seven, or nine times the frequency of the third noise. In an embodiment of the invention, the frequency of the third noise (for increasing frequency) can be three, five, seven, or nine times the frequency of the second noise.

In another embodiment of the invention, the frequency of the first noise (for increasing frequency) can be an integer or non-integer multiple of the frequency of the third noise. In an embodiment of the invention, the frequency of the third noise (for increasing frequency) can be an integer or non-integer multiple of the frequency of the second noise.

In further embodiment of the invention, the progression of the frequency of the second noise (for increasing frequency) can correspond with a phase delay to the progression of the frequency of the third noise. In further embodiment of the invention, the progression of the frequency of the third noise (for increasing frequency) can correspond with a phase delay to the progression of the frequency of the frequency of the first noise.

In a further embodiment of the invention, the frequency or pitch of the first noise (for decreasing frequency) can be lower than the frequency or pitch of the third noise, in particular by at least one octave. In a further embodiment of the invention, the frequency or pitch of the third noise (for decreasing frequency) can be lower than the frequency or pitch of the second noise, in particular by at least one octave.

In an embodiment of the invention, the frequency of the second noise (for decreasing frequency) can be three, five, seven, or nine times the frequency of the third noise. In further embodiment of the invention, the frequency of the third noise (for decreasing frequency) can be three, five, seven, or nine times the frequency of the first noise.

In an embodiment of the invention, the frequency of the second noise (for decreasing frequency) can be an integer or non-integer multiple of the frequency of the third noise. In a further embodiment of the invention, the frequency of the third noise (for decreasing frequency) can be an integer or non-integer multiple of the frequency of the first noise.

In further embodiment of the invention, the progression of the frequency of the first noise (for decreasing frequency) can corresponds with a phase delay to the progression of the frequency of the third noise. In further embodiment of the invention, the progression of the frequency of the third noise (for decreasing frequency) can corresponds with a phase delay to the progression of the frequency of the frequency of the second noise.

In further embodiment of the invention, the decrease in the volume of the first noise follows the falling part of a bell-shaped curve. In further embodiment of the invention, the increase in the volume of the second noise can follow the rising part of a bell-shaped curve.

The terms "bell-shaped curve" and "bell-shaped function" can be understood to be synonymous in an embodiment of the invention. A bell-shaped curve can be a curve open toward the bottom that begins at zero and ends at zero. The abscissa of a bell-shaped curve can be a logarithm of the frequency. The ordinate of a bell-shaped curve can be the logarithm of the volume. The ordinate of a bell-shaped curve can be the volume in dB. FIG. 5 shows an example of a bell-shaped curve. A bell-shaped curve can be a bell curve. A bell-shaped curve can be similar to a Gaussian bell curve, but does not approach zero asymptotically, instead beginning and ending at zero (analogously, see FIG. 5). The terms "bell curve" and "bell function" can be understood to be synonymous in an embodiment of the invention.

In an embodiment of the invention, the volume of the first noise follows a first frequency-dependent bell-shaped curve or bell-shaped function. In a further embodiment of the invention, the volume of the second noise follows a second frequency-dependent bell-shaped curve or bell-shaped function. In further embodiment of the invention, the volume of the third noise follows a third frequency-dependent bell-shaped curve or bell-shaped function. In further embodiment of the invention, the first frequency-dependent bell-shaped curve or bell-shaped function can be equal to the second frequency-dependent bell-shaped curve or bell-shaped function. In further embodiment of the invention, the first frequency-dependent bell-shaped curve or bell-shaped function can be equal to the third frequency-dependent bell-shaped curve or bell-shaped function. In further embodiment of the invention, the second frequency-dependent bell-shaped curve or bell-shaped function can be equal to the third frequency-dependent bell-shaped curve or bell-shaped function.

In further embodiment of the invention, the shape of the bell-shaped curve can be designed as a function of the acoustical properties of the interior of the vehicle. An interior of the vehicle can be an interior of the vehicle intended for passengers. An interior of the vehicle can be an interior of the vehicle that is intended for a driver.

The aforementioned object is also attained, in particular in combination with one or more of the aforementioned features, by a method for operating a vehicle having an electric drive that has a sound transducer, wherein by means of the sound transducer a first noise with increasing frequency and decreasing volume, a second noise with increasing frequency and increasing volume, and at least one third noise with increasing frequency are generated or output simultaneously, in particular with increasing speed of the electric drive, or a first noise with decreasing frequency and decreasing volume, a second noise with decreasing frequency and increasing volume, and at least one third noise with decreasing frequency are generated or output simultaneously, in particular with decreasing speed of the electric drive.

In further embodiment of the invention, the frequency or pitch of the first noise (for increasing frequency) can be higher than the frequency or pitch of the third noise, in particular by at least one octave. In a further embodiment of the invention, the frequency or pitch of the third noise (for increasing frequency) can be higher than the frequency or pitch of the second noise, in particular by at least one octave.

In a further embodiment of the invention, the frequency of the first noise (for an increasing frequency) can be three, five, seven, or nine times the frequency of the third noise. In further embodiment of the invention, the frequency of the third noise (for increasing frequency) can be three, five, seven, or nine times the frequency of the second noise.

In another embodiment of the invention, the frequency of the first noise (for increasing frequency) can be an integer or non-integer multiple of the frequency of the third noise. In further embodiment of the invention, the frequency of the third noise (for increasing frequency) can be an integer or non-integer multiple of the frequency or pitch of the second noise.

In further embodiment of the invention, the progression of the frequency of the second noise (for increasing frequency) can correspond with a phase delay to the progression of the frequency of the third noise. In further embodiment of the invention, the progression of the frequency of the third noise (for increasing frequency) can correspond with a phase delay to the progression of the frequency of the frequency of the first noise.

In further embodiment of the invention, the frequency or pitch of the first noise (for decreasing frequency) can be lower than the frequency or pitch of the third noise, in particular by at least one octave. In a further embodiment of the invention, the frequency or pitch of the third noise (for decreasing frequency) can be lower than the frequency or pitch of the second noise, in particular by at least one octave.

In further embodiment of the invention, the frequency of the second noise (for decreasing frequency) can be three, five, seven, or nine times the frequency of the third noise. In further embodiment of the invention, the frequency of the third noise (for decreasing frequency) can be three, five, seven, or, nine times the frequency of the first noise.

In another embodiment of the invention, the frequency of the second noise (for decreasing frequency) can be an integer or non-integer multiple of the frequency of the third noise. In further embodiment of the invention, the frequency of the third noise (for decreasing frequency) can be an integer or non-integer multiple of the frequency or pitch of the first noise.

In further embodiment of the invention, the progression of the frequency of the first noise (for decreasing frequency) can correspond with a phase delay to the progression of the frequency of the third noise. In further embodiment of the invention, the progression of the frequency of the third noise (for decreasing frequency) can correspond with a phase delay to the progression of the frequency of the frequency of the second noise.

In further embodiment of the invention, the decrease in the volume of the first noise follows the falling part of a bell-shaped curve. In further embodiment of the invention, the increase in the volume of the second noise follows the rising part of a bell-shaped curve.

In further embodiment of the invention, the shape of the bell-shaped curve can be designed as a function of the acoustical properties of the interior of the vehicle.

The aforementioned object is also attained, in particular in combination with one or more of the aforementioned features, by a vehicle having an electric drive and having a sound transducer, wherein the vehicle comprises a sound generator for simultaneous emission of a first noise with increasing frequency and a volume corresponding to a frequency-dependent first bell-shaped curve and at least one second noise with increasing frequency and a volume corresponding to a frequency-dependent second bell-shaped curve by means of the sound transducer, in particular with increasing speed of the electric drive, and/or a first noise with decreasing frequency and a volume corresponding to a frequency-dependent first bell-shaped curve and at least one second noise with decreasing frequency and a volume corresponding to a frequency-dependent second bell-shaped curve by means of the sound transducer, in particular with decreasing speed of the electric drive, wherein provision is made in particular for the frequency or pitch of the first noise to be higher than the frequency or pitch of the second noise, in particular by at least one octave.

In further embodiment of the invention, the frequency of the first noise can be three, five, seven, or nine times the frequency of the second noise. In another embodiment of the invention, the frequency of the first noise can be an integer or non-integer multiple of the frequency of the second noise. In further advantageous embodiment of the invention, the progression of the frequency of the second noise corresponds with a phase delay to the progression of the frequency of the first noise.

In further embodiment of the invention, the shape of the first bell-shaped curve can be equal or substantially equal to the shape of the second bell-shaped curve. In further embodiment of the invention, the shape of the bell-shaped curve is designed as a function of the acoustical properties of the interior of the vehicle.

The aforementioned object is also attained, in particular in combination with one or more of the aforementioned features, by a method for operating a vehicle having an electric drive that has a sound transducer, wherein by means of the sound transducer a first noise with increasing frequency and a volume corresponding to a frequency-dependent first bell-shaped curve and at least one second noise with increasing frequency and a volume corresponding to a frequency-dependent second bell-shaped curve are generated or output simultaneously, in particular with increasing speed of the electric drive, or a first noise with decreasing frequency and a volume corresponding to a frequency-dependent first bell-shaped curve and at least one second noise with decreasing frequency and a volume corresponding to a frequency-dependent second bell-shaped curve are generated or output simultaneously, in particular with decreasing speed of the electric drive, wherein provision is made in particular for the frequency or pitch of the first noise to be higher than the frequency or pitch of the second noise, in particular by at least one octave.

In further embodiment of the invention, the frequency of the first noise can be three, five, seven, or nine times the frequency of the second noise. In another embodiment of the invention, the frequency of the first noise can be an integer or non-integer multiple of the frequency of the second noise. In further advantageous embodiment of the invention, the progression of the frequency of the second noise corresponds with a phase delay to the progression of the frequency of the first noise.

In further embodiment of the invention, the shape of the first bell-shaped curve can be equal to the shape of the second bell-shaped curve. In further advantageous embodiment of the invention, the shape of the bell-shaped curve can be designed as a function of the acoustical properties of the interior of the vehicle.

The aforementioned object is also attained, in particular in combination with one or more of the aforementioned features, by a vehicle having an electric drive and having a sound transducer, wherein the vehicle comprises a sound generator for emission of a noise, in particular with increasing frequency, by means of the sound transducer, in particular with increasing speed of the electric drive, wherein the noise comprises a virtual fundamental tone with harmonics of the fundamental tone corresponding to the virtual fundamental tone, but not the fundamental tone itself, and/or for emission of a noise, in particular with decreasing frequency, by means of the sound transducer, in particular with decreasing speed of the electric drive, wherein the noise comprises a virtual fundamental tone with harmonics of the fundamental tone corresponding to the virtual fundamental tone, but not the fundamental tone itself.

In an embodiment of the invention, the noise does not contain at least the first harmonic of the fundamental tone. In a further embodiment of the invention, the noise does not contain at least the second harmonic of the fundamental tone. In a further embodiment of the invention, the noise does not contain at least the third harmonic of the fundamental tone. In a further embodiment of the invention, the noise does not contain at least the fourth harmonic of the fundamental tone.

The aforementioned object is also attained, in particular in combination with one or more of the aforementioned features, by a method for operating a vehicle having an electric drive that has a sound transducer, wherein by means of the sound transducer a noise, in particular with increasing frequency, is generated or output, in particular with increasing speed of the electric drive, and/or a noise, in particular with decreasing frequency, is generated or output, in particular with decreasing speed of the electric drive, wherein the noise comprises a virtual fundamental tone with harmonics of the fundamental tone corresponding to the virtual fundamental tone, but not the fundamental tone itself.

The invention makes it possible in an especially suitable manner to acoustically simulate an acceleration process of a vehicle having an electric drive for a driver or another passenger or other passengers, wherein even long, in particular positive, accelerations can be simulated in an especially suitable manner. The invention is especially suitable for positive accelerations, in particular long positive accelerations, in combination with increasing frequencies. In particular, the invention serves to acoustically simulate an acceleration process in a vehicle having an electric drive.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
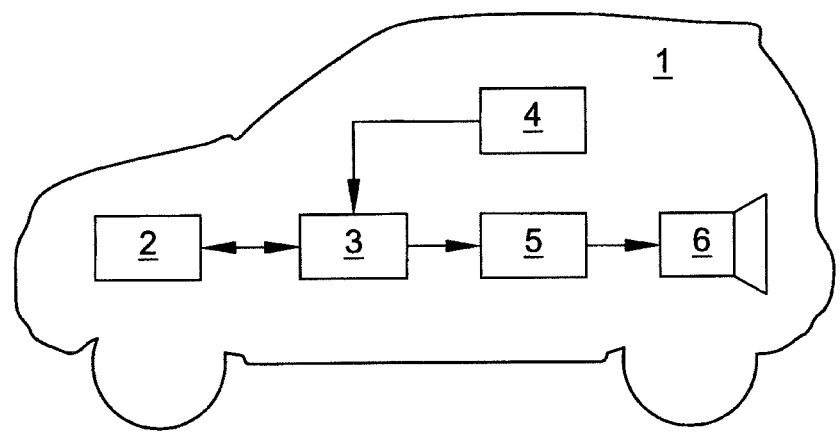
FIG. 1 shows a functional schematic representation of an exemplary embodiment of a vehicle having an electric drive.
Figure 4:
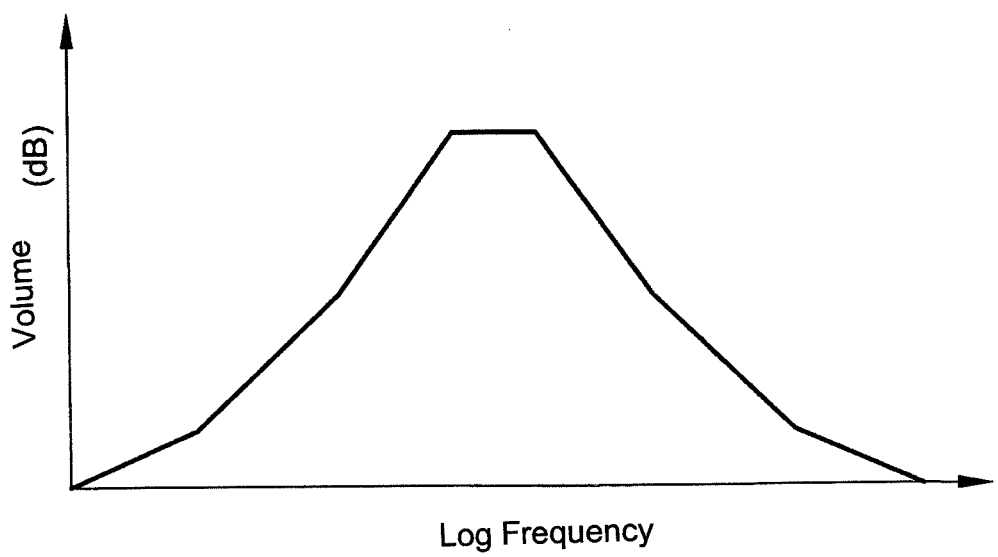
FIG. 4 shows an exemplary embodiment for a bell-shaped curve.
Figure 5:
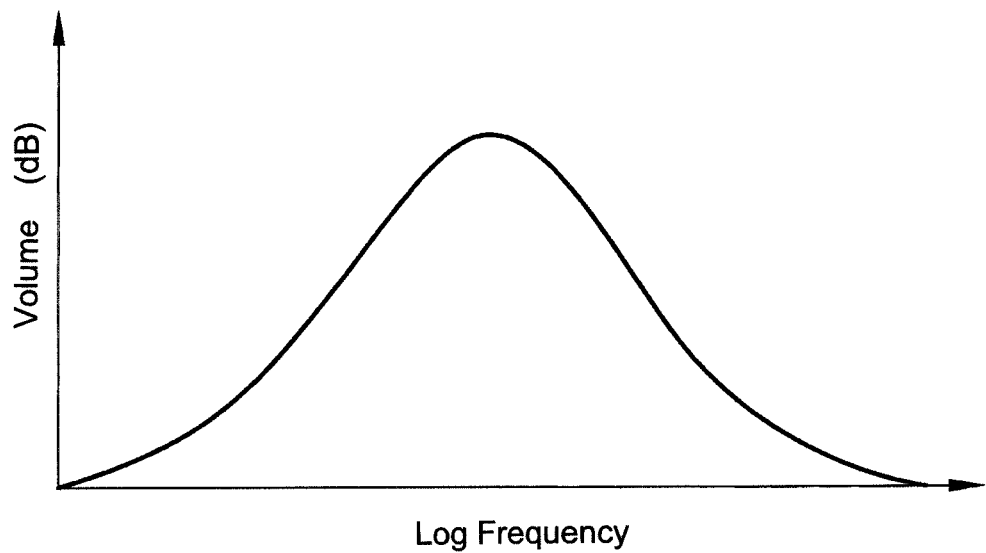
FIG. 5 shows an especially suitable exemplary embodiment for a bell curve.

FIG. 1 shows a vehicle 1 having an electric drive 2 that is controlled by means of a motor controller 3. To operate and regulate the electric drive 2, a control element 4 is provided that acts on the drive controller 3. The vehicle 1 further comprises a sound generator 5. An acoustic simulation of an acceleration process of the vehicle 1 is generated by means of the sound generator 5 and is output by means of a sound transducer 6. The sound generator 5 here produces in particular a Shepard-Risset glissando. In particular, provision is made that in the case of positive acceleration of the vehicle 1, a noise with increasing frequency and decreasing volume, a noise with increasing frequency and increasing volume, and another noise with increasing frequency are output simultaneously. In this process, the noise with increasing frequency and decreasing volume is at least one octave higher than the last-mentioned noise. That noise in turn is at least one octave higher than the noise with increasing frequency and increasing volume. In particular, provision is made that the volumes of the noises follow a bell-shaped curve or the bell curve over their frequencies. For example, a bell-shaped curve is shown in FIG. 4. An especially suitable bell curve is shown in FIG. 5. In particular, provision is also made that in the case of negative acceleration of the vehicle 1, a noise with decreasing frequency and decreasing volume, a noise with decreasing frequency and increasing volume, and another noise with decreasing frequency are output simultaneously. In this process, the noise with decreasing frequency and decreasing volume is at least one octave lower than the last-mentioned noise. That noise in turn is at least one octave lower than the noise with decreasing frequency and increasing volume.

Figure 2:
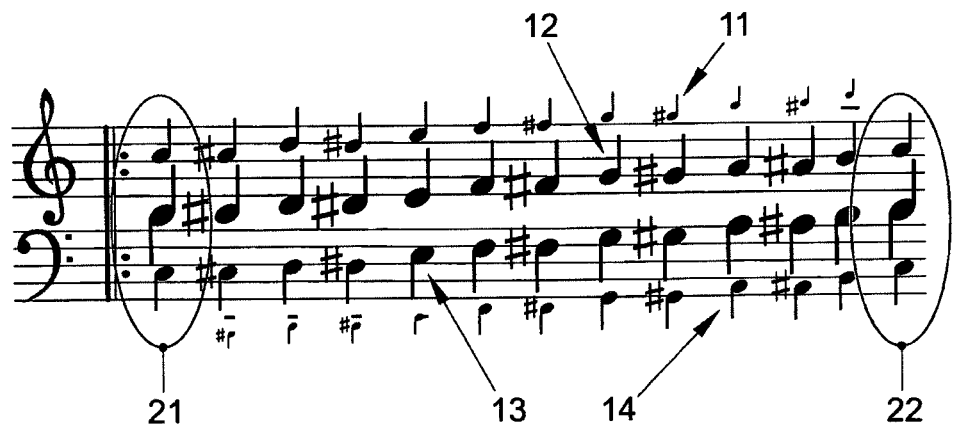
FIG. 2 shows an exemplary embodiment of a Shepard scale.
Figure 3:
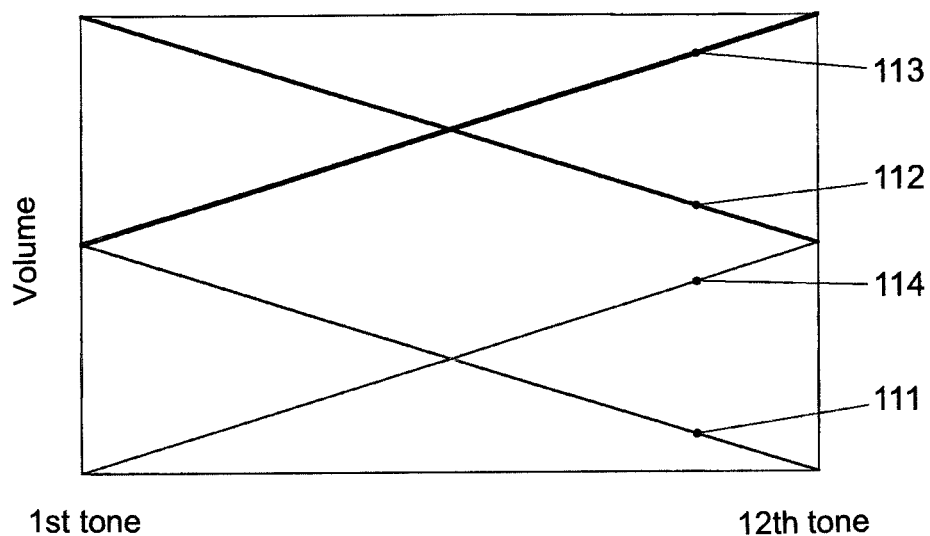
FIG. 3 shows an exemplary embodiment for volume progression of the individual tones of the Shepard scale from FIG. 2.

The superposition of multiple noises in the meaning of the invention is illustrated with the aid of FIG. 2 using the example of discrete scales, with the individual scales being labeled with the reference symbols 11, 12, 13, and 14. The volume of each of the scales 11, 12, 13, and 14 is symbolized by the size of their notes. Moreover, the volumes of the scales 11, 12, 13, and 14 are shown for the (first) twelve tones in FIG. 3. In this case, the line labeled with reference symbol 111 represents the progression of the volume of the scale 11, the line labeled with reference symbol 112 represents the progression of the volume of the scale 12, the line labeled with reference symbol 113 represents the progression of the volume of the scale 13, and the line labeled with reference symbol 114 represents the progression of the volume of the scale 14. The scales 11, 12, 13, and 14 are matched with their volumes 111, 112, 113, and 114 such that the first chord marked with the ellipse 21 is identical to the thirteenth chord marked with the ellipse 22.

Figure 6:
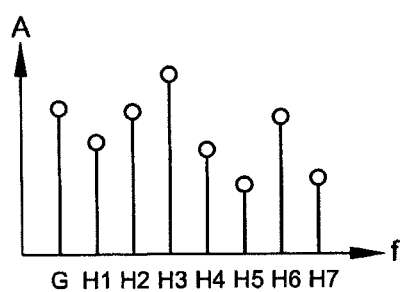
FIG. 6 shows an exemplary embodiment for a noise with a fundamental tone.
Figure 7:
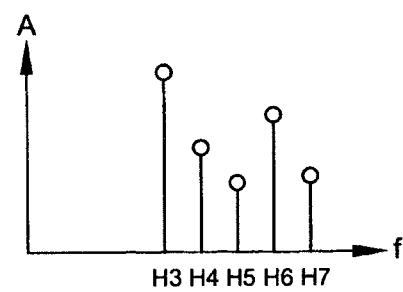
FIG. 7 shows an exemplary embodiment of a spectrum for generating a virtual fundamental tone without the fundamental tone corresponding to the virtual fundamental tone being part of the spectrum itself.

Furthermore, provision is advantageously made that a noise comprises a virtual fundamental tone with harmonics of the fundamental tone corresponding to the virtual fundamental tone, but not the fundamental tone itself, as is illustrated with the aid of the example shown in FIG. 6 and FIG. 7. FIG. 6 shows the spectrum of a noise, wherein the frequency of the spectral components is labeled f and the amplitude of the spectral components is labeled A. G designates the fundamental tone, H1 the first harmonic of the fundamental tone, H2 the second harmonic of the fundamental tone, H3 the third harmonic of the fundamental tone, H4 the fourth harmonic of the fundamental tone, H5 the fifth harmonic of the fundamental tone, H6 the sixth harmonic of the fundamental tone, and H7 the seventh harmonic of the fundamental tone.

FIG. 7 shows the spectrum of another noise, corresponding to the noise shown in FIG. 6 reduced by the fundamental tone G, the first harmonic H1, and the second harmonic H2. The harmonics H3, H4, H5, H6 and H7 of the noise in FIG. 7 form for the listener the impression of a virtual fundamental tone that corresponds to the fundamental tone G of the noise in FIG. 6. In an analogous manner, at least the fundamental tone G and, if applicable, the lower harmonics, are advantageously omitted from the noises generated by means of the sound generator 5. In this way, it is possible in an especially suitable manner to simulate acceleration processes starting at low speeds, especially when they take place up to a high speed. In an advantageous embodiment, the frequencies of the fundamental tones or virtual fundamental tones of the noises are:

$$\frac{n \cdot U}{60s}$$

where n is a natural number and U is the speed of the electric drive 2 in revolutions per minute.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle comprising:
an electric drive;
a sound transducer; and a sound generator configured to substantially simultaneously generate a first noise with increasing frequency and decreasing volume, a second noise with increasing frequency and increasing volume, and at least one third noise with increasing frequency via the sound transducer with increasing speed of the electric drive, wherein series of the first, second and third noises are generated substantially simultaneously and are cycled to form a Shepard-Risset glissando effect.

2. A vehicle comprising:
an electric drive;
a sound transducer; and
a sound generator configured to substantially simultaneously generate a first noise with increasing frequency and decreasing volume, a second noise with increasing frequency and increasing volume, and at least one third noise with increasing frequency via the sound transducer with increasing speed of the electric drive,
wherein a frequency or pitch of the first noise is higher than the frequency or pitch of the third noise by at least one octave.

3. A vehicle comprising:
an electric drive;
a sound transducer; and
a sound generator configured to substantially simultaneously generate a first noise with increasing frequency and decreasing volume, a second noise with increasing frequency and increasing volume, and at least one third noise with increasing frequency via the sound transducer with increasing speed of the electric drive,
wherein a frequency or pitch of the third noise is higher than the frequency or pitch of the second noise by at least one octave.

4. The vehicle according to claim 1, wherein a decrease in volume of the first noise follows a falling part of a bell-shaped curve.

5. The vehicle according to claim 1, wherein the increase in the volume of the second noise follows a rising part of a bell-shaped curve.

6. The vehicle according to claim 4, wherein a shape of the bell-shaped curve is designed as a function of acoustical properties of an interior of the vehicle.

7. A method for operating a vehicle according to claim 1, wherein, via the sound transducer the first noise with increasing frequency and decreasing volume, the second noise with increasing frequency and increasing volume, and the at least one third noise with increasing frequency are generated or output substantially simultaneously with increasing speed of the electric drive.

8. A vehicle comprising:
an electric drive;
a sound transducer; and
a sound generator configured to substantially simultaneously generate a first noise with increasing or decreasing frequency and a volume corresponding to a frequency-dependent first bell-shaped curve and at least one second noise with decreasing or increasing frequency and a volume corresponding to a frequency-dependent second bell-shaped curve via the sound transducer,
wherein a shape of the bell-shaped curve is a function of acoustical properties of an interior of the vehicle.

9. A method for operating a vehicle according to claim 8, wherein, via the sound transducer, the first noise with increasing or decreasing frequency and a volume corresponding to a frequency-dependent first bell-shaped curve and the at least one second noise with increasing or decreasing frequency and a volume corresponding to a frequency-dependent second bell-shaped curve are generated or outputted substantially simultaneously with increasing or decreasing speed of the electric drive.

10. A vehicle comprising:
an electric drive;
a sound transducer; and
a sound generator configured to substantially simultaneously generate a first noise with increasing frequency and decreasing volume, a second noise with increasing frequency and increasing volume, and at least one third noise with increasing frequency via the sound transducer with increasing speed of the electric drive,
wherein the first noise, the second noise, or the third noise comprises a virtual fundamental tone with harmonics of the fundamental tone corresponding to the virtual fundamental tone, but not the fundamental tone itself.

11. The vehicle according to claim 10, wherein the first noise, the second noise, or the third noise does not include at least the first harmonic of the fundamental tone.

12. A method for operating a vehicle according to claim 10, wherein, via the sound transducer, a noise is generated or outputted, and wherein the noise comprises a virtual fundamental tone with harmonics of the fundamental tone corresponding to the virtual fundamental tone, but not the fundamental tone itself.

13. A vehicle comprising:
an electric drive;
a sound transducer; and
a sound generator configured to substantially simultaneously generate a first noise with decreasing frequency and decreasing volume, a second noise with decreasing frequency and increasing volume, and at least one third noise with decreasing frequency via the sound transducer with decreasing speed of the electric drive,
wherein series of the first, second and third noises are generated substantially simultaneously and are cycled to form a Shepard-Risset glissando effect.

14. A method for operating a vehicle according to claim 13, wherein, via the sound transducer, the first noise with decreasing frequency and decreasing volume, the second noise with increasing or decreasing frequency and increasing volume, and the at least one third noise with increasing or decreasing frequency are generated or outputted substantially simultaneously with decreasing speed of the electric drive.

15. The vehicle according to claim 1, wherein the first noise, the second noise and the third noise are superposed.

16. A vehicle comprising:
an electric drive;
a sound transducer; and
a sound generator configured to simultaneously generate and superpose a first noise with increasing or decreasing frequency and increasing or decreasing volume, a second noise with increasing or decreasing frequency and increasing or decreasing volume, and at least one third noise with increasing or decreasing frequency via the sound transducer with changing speed of the electric drive,
wherein series of the first, second and third noises are generated substantially simultaneously and are cycled to form a Shepard-Risset glissando effect.

17. The vehicle according to claim 2, wherein the first noise, the second noise, or the third noise comprises a virtual fundamental tone with harmonics of the fundamental tone corresponding to the virtual fundamental tone, but not the fundamental tone itself.

18. The vehicle according to claim 3, wherein the first noise, the second noise, or the third noise comprises a virtual fundamental tone with harmonics of the fundamental tone corresponding to the virtual fundamental tone, but not the fundamental tone itself.

\* \* \* \* \*